June 6, 1972 H. BLANCHARD 3,667,888
DEVICE FOR REMOVING BOTTOM SCRAPS OF EXTRUSION-BLOWN
HOLLOW THERMOPLASTIC BODIES
Filed June 12, 1970 3 Sheets-Sheet 1
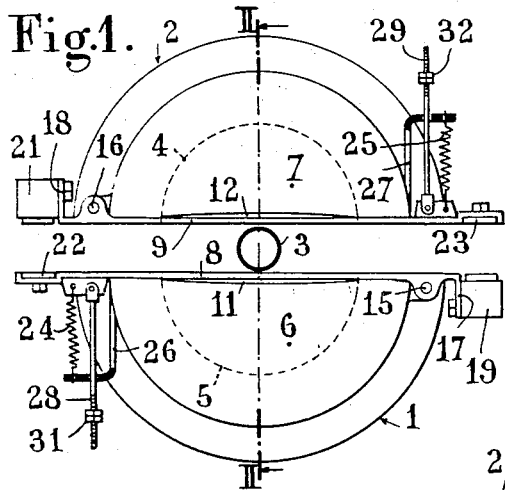
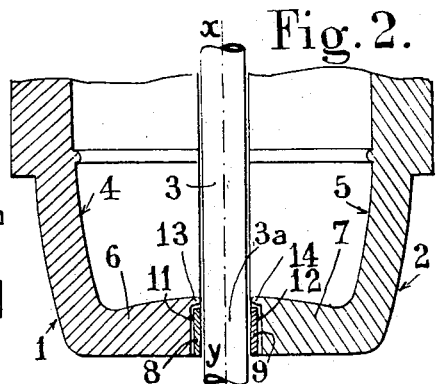
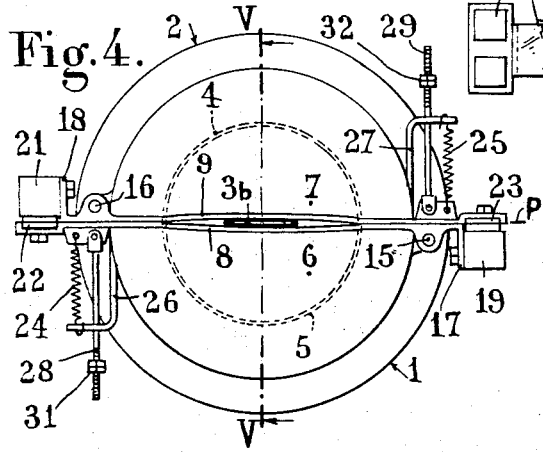
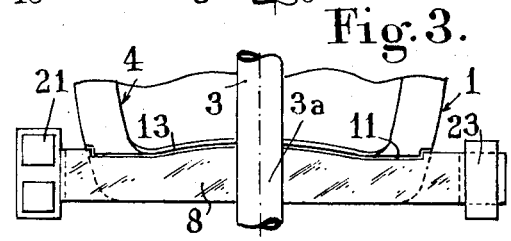
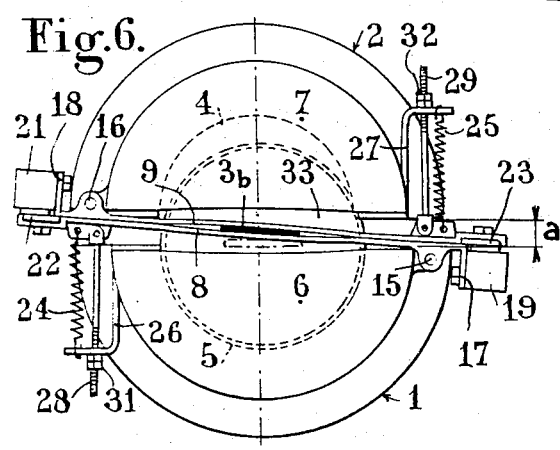
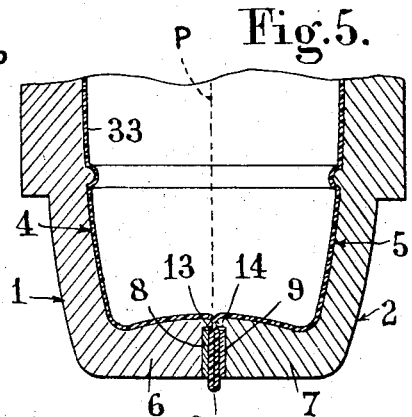
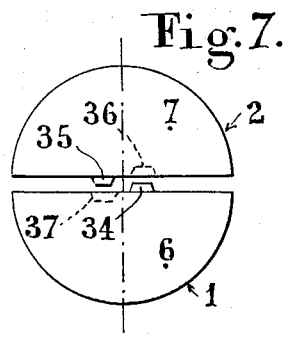

United States Patent Office 3,667,888
Patented June 6, 1972

3,667,888
DEVICE FOR REMOVING BOTTOM SCRAPS OF EXTRUSION-BLOWN HOLLOW THERMOPLASTIC BODIES
Hunert Blanchard, Le Havre, France, assignor to Sidel, Le Havre, France
Filed June 12, 1970, Ser. No. 45,727
Claims priority, application France, June 18, 1969, 6920326
Int. Cl. B29d 23/03
U.S. Cl. 425—307                    14 Claims

ABSTRACT OF THE DISCLOSURE

This invention relates to the moulding of thermoplastic articles by the so-called extrusion-blowing process and provides a device for separating in a mould the bottom scrap formed in the mould bottom, this device comprising in at least one of the mould halves, at the level of said bottom scrap, a member on which said scrap is adapted to be crushed during the mould closing movement and said member is also adapted, during the mould opening movement, to produce a displacement of said scrap in relation to the bottom of the blown hollow body retained in the mould-half provided with said member. This invention is applicable to the removal of moulding scraps, wastes and like useless projections formed during the moulding of hollow articles.

BACKGROUND OF THE INVENTION

The present invention relates to a device for separating in a mould the bottom scrap of a hollow thermoplastic body manufactured by the so-called extrusion-blowing process.

It is known that present methods of manufacturing hollow bodies of thermoplastic material by the so-called extrusion-blown process lead to the production of hollow bodies comprising a scrap, waste or appendage located at the bottom of the hollow body, that is, opposite to the opening through which the blowing fluid is introduced. This scrap or waste, also referred to as the "plug," corresponds to an unavoidable extra length of the blown plastic tube section previously extruded as a parison.

This hollow body bottom scrap must of course be removed for obtaining a finished product. This operation, also called "plug removal," carried out preferably within the mould proper, when the blown hollow body has cooled sufficiently.

Various devices incorporated in a mould and adapted to separate from the mould bottom the protruding scrap, waste or plug attached thereto as a consequence of the blowing operation have already been proposed. All these known devices comprise one or a plurality of pliers or claws responsive to appropriate power means such as pneumatic actuators in order to exert on the bottom scrap a tractive effort substantially in the axial direction of, and away from, the blown hollow body. As a consequence of this tractive effort, the scrap, waste or plug is torn off and separated from the body.

Now all these known devices are objectionable in that they require for each mould a relatively complicated mechanism and a power member such as a pneumatic actuator, and of course circuit means for supplying compressed air to this actuator.

SUMMARY OF THE INVENTION

It is the chief object of the present invention to avoid this inconveience by providing a device of particularly simple design whereby the bottom scrap can be separated from the hollow body by simply causing a relative movement of the two mould halves, during the mould opening movement, without resorting to any auxiliary power-actuated member.

To this end, the device according to this invention for separating in a mould the bottom scrap of a hollow thermoplastic body manufactured by the extrusion-blowing process, this hollow body being obtained from an initial section of a previously extruded tubular parison which is enclosed between two mould halves, is characterized in that at least one of said mould halves, at the location where the bottom scrap is formed, carries a member on which said scrap is crushed during the mould closing movement, said member being adapted, when the mould is subsequently opened, to cause a shifting of said bottom waste in relation to the bottom of the hollow blown body retained in the mould-half carrying said member, said shifting consisting of a movement of rotation about an axis parallel to the joint plane of the mould and/or a movement of translation perpendicular to the joint plane.

According to a specific form of embodiment of this invention, the device comprises at least one transverse blade hinged at one end about a pivot pin parallel to the mould axis and carried by one of the mould halves, externally thereof, said blade being urged by spring means into a recess of said mould-half where the bottom scrap is formed and engaged by the central portion of said blade, and a device carried by the other half mould for firmly holding the free end of said blade during an opening stroke of predetermined amplitude of said mould halves, and subsequently releasing said blade which is then returned by said spring means to its inoperative position in which it engages the half mould by which it is carried.

The device provided for holding the free end of said blade consists either of a permanent magnet, or of a spring-loaded catch.

Preferably, each mould-half carries transvesre blade of the type set forth hereinabove and the pivot pins of the two blades are diametrally opposed, each blade carrying at its end opposite to its pivot pin a permanent magnet or a spring-loaded catch.

According to a modified form of embodiment of this invention, each mould half carries in its joint plane and in the zone where the bottom scrap is formed one or a plurality of projections engaging corresponding and registering recesses formed in the other mould-half, said projections being adapted to anchor the bottom scrap during the mould closing movement and therefore to cause said bottom scrap to be torn off during the mould opening movement.

The device according to this invention is advantageous in that it does not require the use of any complementary power-assisted mechanism carried by the mould since the relative movements of the component elements of the device for detaching the bottom scrap are simply derived from the mould opening movement.

According to another modification of this invention, the blades carry on their outer faces small, more or less accentuated hook-shaped projections so arranged that said projections are off-set in relation to each other and that the bottom scrap can thus fit partially therebetween by hot distortion, during the mould closing movement, and then cause said blade projection to adhere to each other, during the mould opening movement, when the bottom scrap begins to set as a consequence of the cooling thereof, so as to hold the two blades pressed against each other.

According to a further variation the blades are pressed against each other by a pneumatic force, during the initial phase of the mould opening movement, the application of this force being subsequently discontinued in order to separate said blades when the mould has been opened sufficiently.

The present invention also contemplates the mounting of a half-blade on the relevant mould-half, this mounting being adapted for use irrespective of the means, whether of magnetic, mechanical, pneumatic, or automatic type, utilized for urging the two blades against each other during the initial phase of the mould opening movement.

BRIEF DESCRIPTION OF THE DRAWING

In order to afford a clearer understanding of the present invention and of the mode of operation thereof, a few typical forms of embodiment of the bottom scrap removing device will now be described by way of example with reference to the attached drawing, in which:

FIG. 1 is a plane view from beneath of a two-section mould equipped with the bottom scrap tear-off device according to this invention, the mould being shown in its open position;

FIG. 2 is a section taken along the line II—II of FIG. 1;

FIG. 3 is an elevational view of the lower portion of a mould half with the elements of the bottom scrap tear-off device carried thereby, this view being taken from within the mould;

FIG. 4 is a plane view from beneath of the mould in its closed position;

FIG. 5 is a section taken along the line V—V of FIG. 4;

FIG. 6 is a plane view from beneath showing the mould during the opening thereof, just before the separation of the two joined blades and the release of the tear-off bottom scrap;

FIG. 7 is a plane view from beneath showing a mould equipped with a modified form of embodiment of the device according to this invention;

DESCRIPTION OF THE PREFERRED EMBODIMENT

Figure 8:
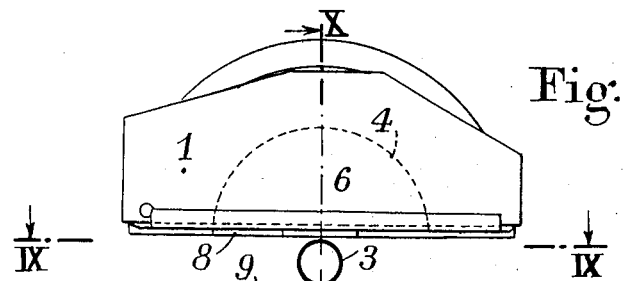
FIG. 8 is a plane view from beneath of the mould before the closing thereof.
Figure 9:
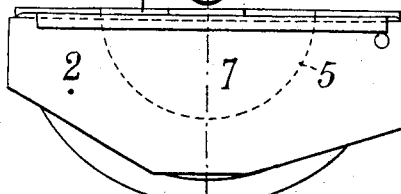
FIG. 9 is a side elevational view of a mould-half as seen in the direction of the line IX—IX of FIG. 8.
Figure 10:
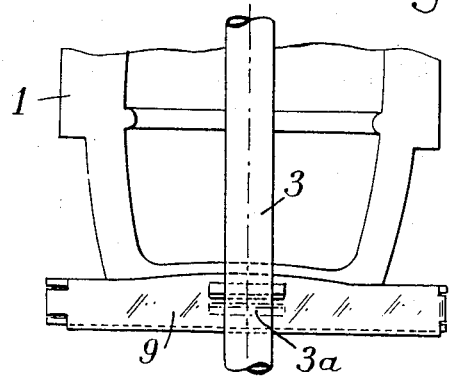
FIG. 10 is a sectional view of the same mould in its closed position, the section being taken along the line X—X of FIG. 8.
Figure 11:
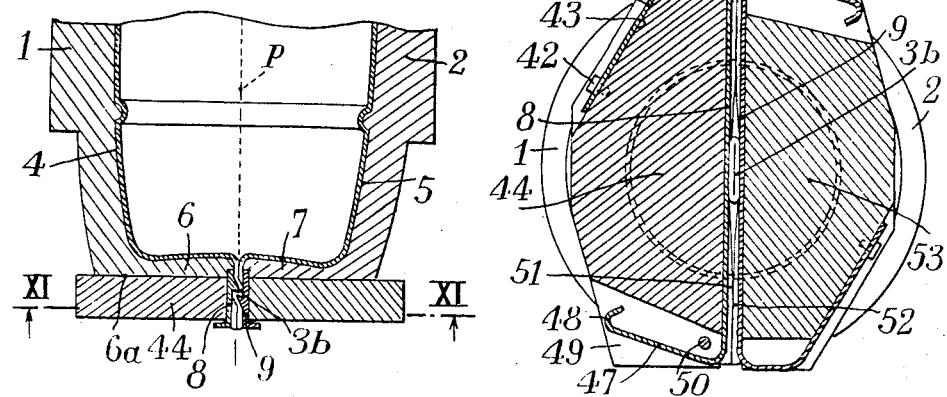
FIG. 11 is a cross section taken along the line XI—XI of FIG. 10.

The device for separating or tearing-off the bottom scrap or waste of a hollow thermoplastic body manufactured by extrusion-blowing according to this invention is illustrated in the drawing as being mounted at the lower portion of a mould comprising two sections or halves 1 and 2. A tubular parison 3 of thermoplastic material is extruded continuously and sections of this parison are trapped in succession between the registering mould halves 1 and 2 during the closing movement of each mould so as to be subsequently expanded by blowing within the closed mould. The mould-halves 1 and 2 are formed with moulding impressions 4 and 5 respectively, and the soft thermoplastic material constituting the parison 3 is pressed against the inner surface of these impressions during the blow-moulding operation proper.

The mould-halves 1 and 2 comprise transverse bottoms 6 and 7, respectively, which engage each other along the joint plane P of the mould, when the latter is closed. During the mould-closing movement the lowermost portion 3a of parison 3 is pinched between the lowermost portion 3a of parison 3 is pinched between the bottoms 6 and 7, so as to close the lower end of the parison section 3. Due to this pinching action a bottom scrap or waste 3b (FIG. 4) is formed, which consists of the plastic material crushed between the two mould halves.

The bottom scrap tear-off device according to this invention comprises a pair of transverse blades 8, 9 carried by the mould-halves 1 and 2, respectively. These blades 8 and 9 are housed in corresponding recesses 11 and 12 formed in the registering joint faces of the bottom mould portions 6 and 7. However, the upper portion of these joint faces is not recessed so as to provide bottom projecting pinching edges 13 and 14 consisting of ribs extending between said mould impressions 4, 5 and recess 11, 12; if desired, these ribs 13 and 14 are curved to accommodate the configuration of the hollow article to be manufactured.

The blades 8 and 9 are each formed with an upper edge shaped to accommodate as near as possible the curvature or shape of the adjacent pinching edges 13 or 14.

In the example illustrated in the drawing as the bottom of the hollow article is concave, the upper edges of blades 8, 9 have a corresponding convex shape to conform that of pinching edges 13 and 14.

The blades 8 and 9 being thus parallel to the joint plane P of the mould and perpendicular to the axis $xy$ of parison 3 are hingedly mounted at one end about pivot pins 15, 16, respectively, carried by the mould-halves 1 and 2, respectively. These pivot pins 15 and 16 are parallel to the axis $xy$ of parison 3 and mounted to the bottoms 6, 7 at diametrally opposite locations.

The blades 8 and 9 are formed with an outer extension, beyond the pivot pins 15, 16 repsectively, in the form of lugs 17, 18 respectively, bent at right angles and having permanent magnets 19 and 21 secured thereto.

At their ends opposite to the pivot pins 15 and 16 the blades 8 and 9 further carry metal armatures 22 and 23 registering with the poles of permanent magnets 21 and 19, respectively. However, this arrangement could be reversed, the permanent magnets 19, 21 being secured in this case to the ends of blades 8, 9 which are opposite to the pivot pins 15 and 16 so as to co-act with armatures carried by the blades adjacent their pivot pins.

The blades 8, 9 are constantly urged towards their supporting mould-half by corresponding traction springs 24 and 25, respectively, attached at one end to said blades and at the other end to bent arms of angle members 26, 27 secured to bottoms 6 and 7, respectively.

Means are also provided for limiting the permissible angular excursions of blades 8 and 9 about their pivot pins 15 and 16. These means may consist, for example, of rods 28, 29 connected to the movable ends of blades 8 and 9 and extending through said angle members 26, 27, and of corresponding adjustment nuts 31, 32 engaging the screw-threaded end portions of these rods for adjusting the permissible amplitude of the pivotal movements performed by said blades.

Now the operation of the device described hereinabove will be described in detail.

When the mould is open (FIGS. 1 to 3) the blades 8 and 9 are retained in their relevant recesses 11 and 12 by the force of the corresponding return springs 24 and 25, so that they are somewhat recessed in relation to the joint plane P of the mould. Then the hot parison 3 is introduced into the gap formed between the two mould halves 1 and 2 by using known means (not shown).

During the subsequent mould closing operation the two mould halves 1 and 2 are clamped together whereby the parison 3 is trapped therein. The lower portion 3a of parison 3 is pinched between the transverse blades 8 and 9 and constitutes a bottom scrap or waste portion 3b (FIGS. 4 and 5). Besides, the weld seam at the lower end of parison 3 is formed between the two pinching edges 13 and 14.

Then the blowing step is carried out by introducing compressed air into the parison 3, whereby the walls thereof are pressed against the surfaces of impression 4 and 5, to constitute a hollow body 33. This blown hollow body is subsequently cooled in the closed mould.

The mould is then opened. At this time, the two blades 8, 9 assembled as shown in FIGS. 4 and 5 are solid with each other due to the magnetic attraction exerted by the magnets 19 and 21 on the opposite armatures 23 and 22. Therefore, during a certain fraction of the mould opening stroke the blades 8 and 9 pivot about their pivot pins 15 and 16, respectively, while remaining in close contact, as illustrated in FIGS. 6. This pivotal movement is attended by a slight relative slip of the two blades 8 and 9 on each other. Since the bottom scrap 3b is retained between the blades 8 and 9, the pivotal movement of these blades (which assume a substantially oblique position corresponding somewhat to the imaginary line interconnecting the axes of pivot pins 15 and 16) can take place only if the scrap 3b is separated from the bottom of the blown body 33. In fact, this hollow body is retained by known means, not shown in one of the two mould halves, in this instance mould-half 1, and on the other hand its resistance to any force tending to extract it from the mould impression increases with the radius of curvature of the bottom of said hollow body 33. This resistance may be increased by providing any known means for anchoring the bottom to the mould-half, according to requirements.

The nearer the upper edges of blades 8 and 9 to the thinned line formed by the ribs 13 and 14, the easier the removal of bottom scrap 3b. In this respect, it is advantageous that the upper edges of blades 8 and 9 be conformed as close as possible to the shape of said pinching ribs 13 and 14, as already mentioned in the foregoing.

The removal of the bottom scrap will also be facilitated by the fact that blade 8 exerting a thrust thereagainst is flexible, since the tear-off stress increases from one end of the thinned line formed by the two pinching edges 13 and 14 to the other end of this line as the mould opening movement proceeds.

At the end of the mould opening movement or stroke at the bottom scrap 3b is fully severed from the bottom of the blown-moulded hollow body, as clearly illustrated in FIG. 6. At this time the means limiting the pivotal movement of blades 8 and 9 have completed their stroke, as shown by the engagement between nuts 31 and 32, on the one hand, and angle members 26 and 27, on the other hand. Then, since the mould opening movement is continued, the armatures 23 and 22 are moved away from the relevant magnets 19 and 21, so that the blades are released from their magnetic attraction and resume their inoperative position under the influence of return springs 24 and 25. Due to the separation of blades 8 and 9, the bottom scrap 3b falls by gravity. It shows no tendency to adhere to blades 8, 9 since a sliding movement of blades 8, 9 relative to the bottom scrap 3b took place during the mould opening movement. If the scrap 3b had any tendency to adhere to one or the other of these blades, a slight shock applied to the blade during its return movement to its inoperative position against the corresponding mould half will be sufficient for causing it to drop.

Then the device resumes its initial position shown in FIG. 1 and is ready for another operation.

According to a modified form of embodiment, the permanent magnets 19 and 21 may be replaced by spring-loaded catches each adapted to release the opposite blade due to the relative slip of blades 8 and 9 during the mould opening operation. In this case, each mould half carries a spring-loaded catch adapted to engage the end of the blade carried by the opposite mould half, in the closed-mould position. This catch has in this case the same function as the magnets 19 and 21 during the mould opening operation.

According to a simplified form of embodiment the device may comprise only one blade 8 or 9, in case the tearing-off of the bottom scrap 3b appears to be particularly easy. In this case, one of the mould halves carries the single blade of which the permissible angular excursion is limited in the manner described hereinabove, the other mould-half carrying simply a permanent magnet or a spring-loaded catch causing the pivotal movement of the blade during the initial portion of the mould opening stroke.

According to another form of embodiment illustrated in FIG. 7, at the limit the bottom scrap can be torn off without resorting to any blade system. To this end it is only necessary to provide in the joint plane of the mould, at the level of the bottom scrap, hooking means or projections 34 and 35 carried by the pair of mould halves 1 and 2 and engaging corresponding recesses 36 and 37 formed in the joint faces. Thus, during the mould closing movement the bottom scrap of the parison is crushed between the projections 34 and 35 to which it is anchored. Therefore, during the mould opening movement these projections 34 and 35 will somewhat twist the bottom scrap 3b and this movement may in certain cases prove sufficient for tearing off the scrap. If necessary, a small blowpipe fed with compressed air may be used for causing the fall of the scrap.

Figure 12:
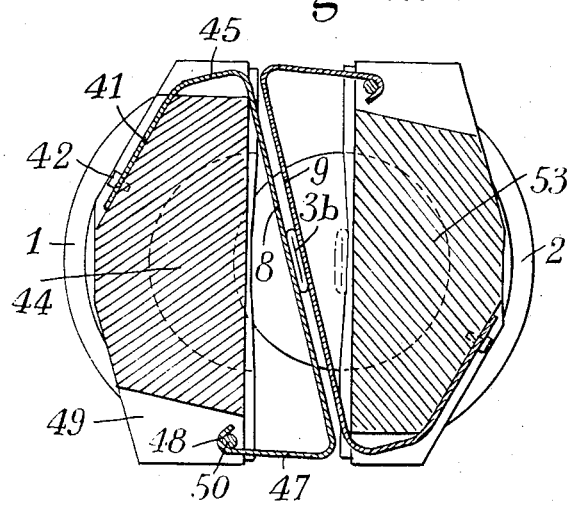
FIG. 12 is a view similar to FIG. 11, after the initial phase of the mould opening operation.
Figure 13:
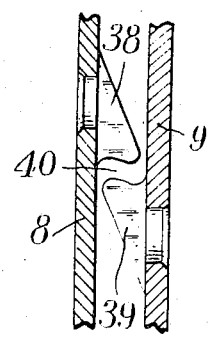
FIG. 13 is a view showing on a larger scale the blade projections.

In the form of embodiment illustrated in FIGS. 8 to 13, each one of the pair of blades 8 and 9 provided therein comprises on its inner face a hook-shaped projection 38, 39 as shown on a larger scale in FIG. 13, the two hook-shaped projections being designed to provide therebetween a slight counter-rake 40. During the mould closing movement, a shown in FIGS. 10 and 11, the lowermost portion 3a of parison 3, which is pinched between the two hook-shaped projections 38 and 39 undergoes a certain deformation, due to its hot-plasticity, so as to partially engage this portion 40 having a slight degree of counter-rake. During the mould opening movement this end portion of the parison has cooled and set, and produces a relatively firm adherence between blades 8 and 9, each blade pivoting about its end engaging the relevant mould-half, whilst its other end moves away therefrom, as illustrated in FIG. 12; means are provided for limiting this movement of the other blade end away from the mould half and restore automatically and resiliently the blades 8 and 9 to their initial positions.

These blades consist each, to this end, of a strip of resilient metal tape which has one end 41 bent backwards and adapted to be secured by suitable means 42 to the rear face 43 of a shoe 44 fastened through any adequate means (not shown) to the lower face 6a of mould-half 6. This bent portion of blade 41 is connected to the blade proper 8 through a spring-forming curved portion 45 adapted to be deflected within a recess 46 provided to this end in shoe 44; the opposite end of blade 8 has a similar extension adapted to be deflected within another recess 49 provided to this end in shoe 44 and is formed with a hook-shaped end portion 48 adapted to co-act with a stud 50 limiting its movement.

This assembly operates as follows (FIG. 12): after the coupled blades 8 and 9 have been moved sufficiently for tearing off the bottom scrap 3b, their hook portion 48 engage the stud 50 limiting their stroke; then both blades 8 and 9 are separated, thus releasing the bottom scrap 3b; they are resiliently urged back to their initial positions and thus caused to strike with force the inner edges 51 and 52 of the pair of shoes 44 and 53, and remain in engagement therewith.

Figure 14:
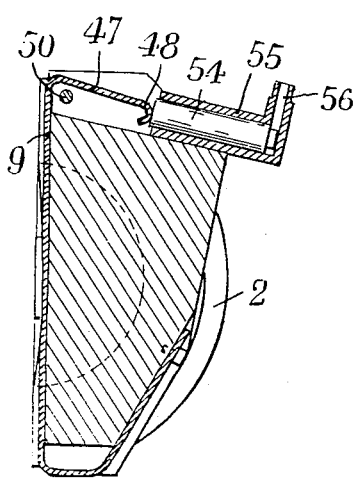
FIG. 14 is a sectional veiw similar to FIG. 11 showing a modified arrangement for controlling the blades.
Figure 15:
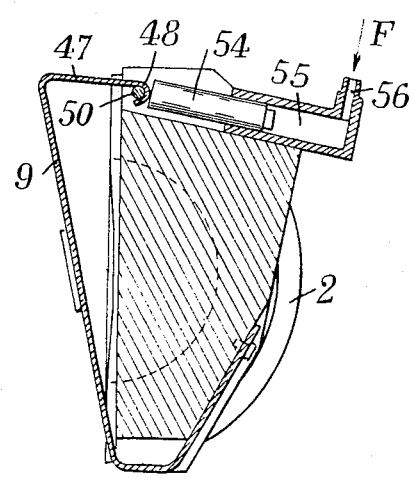
FIG. 15 is a view similar to FIG. 14 illustrating the mode of operation of a blade in this arrangement.

In the form of embodiment illustrated in FIGS. 14 and 15 the resilient blades 8 and 9 are held against each other during the initial portion of the opening movement of the corresponding mould halves 1 and 2 by a pneumatic force; to this end, the hook 48 formed at the end 47 of blades 8 and 9 bears against a piston 54 slidably mounted in a cylinder 55 connected by a line 56 to a source of compressed air (not shown); compressed air is allowed to penetrate into the cylinder 55 during the mould opening movement, as shown by the arrow F in FIG. 15 and this supply is discontinued when the mould is sufficiently open.

The blades 8 and 9 are made preferably from a metal having a good heat diffusion property, such as beryllium bronze, and since on the other hand they are relatively thin, the bottom scrap 3b is cooled through these blades by the mould bottom.

Of course, the various forms of embodiment illustrated and described herein should not be construed as limiting the scope of the invention since many modifications may be brought thereto without departing from the basic principles of the invention as set forth in the appended claims.

I claim:

1. A device for separating the bottom scrap of a hollow body of thermoplastic material manufactured by blowing a section of extruded tube in a two-part mould, comprising at least one blade mounted on one of the mould halves to be pivoting in a plane substantially perpendicular to the axis of said extruded tube section, said blade having a rest position, in which it extends along the joint plane of the mould halves, in front of the bottom scrap to be separated, means for biasing said blade towards its rest position, and means to couple said blade to a part of the other mould half only during a first step of the opening movement of the mould, whereby first the bottom scrap is displaced by said pivoting blade, with respect to the bottom of the hollow body retained in one of the mould halves, in said plane substantially perpendicular to the axis of said extruded tube section, then the blade is returned to its rest position by said biasing means during the second step of the mould opening movement.

2. A device according to claim 1, wherein means to couple said blade to a part of the other mould half comprises a permanent magnet.

3. A device according to claim 1, wherein means to couple said blade to a part of the other mould half comprises a spring-loaded catch.

4. A device according to claim 1, which comprises at least one push member, and means to apply a force to said push member only during said first step of the opening movement of the mould, said push member being adapted to push said blade toward said other mould part.

5. A device according toc laim 1, wherein said blade is mounted on said one mould salf to be pivoting on a pivot pin substantially parallel to the axis of the extruded tube section.

6. A device according to claim 5, wherein means are further provided on said one mould half for limiting the pivoting of said blade about its pivot pin.

7. A device according to claim 1, wherein two blades are respectively mounted on the mould halves to be pivoting in the same sense, in a plane substantially perpendicular to the axis of said extruded tube section, and means are provided to couple said blades to each other only during said first step of the opening movement of the mould.

8. A device according to claim 7, wherein said two blades are respectively mounted on the mould halves to be pivoting about respective pivot pins, substantially parallel to the axis of the extruded tube section, said pivot pins being disposed in a diametrically opposed relationship to each other with respect to said axis.

9. A device according to claim 7, wherein said two blades are provided on their opposite faces with substantially hook-shaped, small projections, disposed in an off-set relationship to each other, whereby the hot bottom scrap is pinched between said projections during the closing movement of the mould, then, having cooled, it adheres to both blades, and said blades are thereby coupled to each other during said first step of the opening movement of the mould.

10. A device for separating the bottom scrap of a hollow body of thermoplastic material manufactured by blowing a section of extruded tube in a two-part mould, comprising at least one blade consisting of a strip of resilient metal, said blade having one end free and the other end secured on a part of one of the mould halves, said blade having a rest position in which it extends alone the joint plane of the mould halves, in front of the bottom scrap to be separated, and means to couple said blade to a part of the other mould half only during a first step of the opening movement of the mould, whereby first the botttom scrap is displaced by said blade with respect to the bottom of the hollow body retained in one of the mould halves, then the blade springs back to its rest position during the second step of the mould opening movement.

11. A device according to claim 10, wherein said other end of said blade has a spring-forming curved portion.

12. A device according to claim 10, wherein said one end of said blade is formed with a hook-shaped, bent portion adapted to engage a stud-like part of said one mould half at the end of said first step of the mould opening movement.

13. A device according to claim 10, which comprises one push member adapted to push the free end of said blade toward said other mould part, and means to apply a force to said push member only during said first step of the mould opening movement.

14. A device according to claim 10, wherein two resilient metal blades are respectively mounted on the mould halves, each of said blade having one end free and the other end secured on a part of the respective mould half, and said one free end of each one of said blades substantially facing said other secured end of the other blade, and means are provided to couple said blades to each other only during said first step of the mould opening movement.

References Cited

UNITED STATES PATENTS

| | | | |
|---|---|---|---|
| 3,428,722 | 2/1969 | Chittenden et al. | 18—5 BS X |
| 3,142,089 | 7/1964 | Wilkalis et al. | 18—5 B M |
| 3,217,072 | 11/1965 | Schaich | 18—5 BQ X |
| 3,031,718 | 5/1962 | Adams | 18—5 BS X |
| 3,003,187 | 10/1961 | Schaich | 18—5 BQ X |

FOREIGN PATENTS

| | | | |
|---|---|---|---|
| 1,434,805 | 2/1966 | France | 18—5 BA |
| 1,580,334 | 9/1969 | France | 18—5 BS |

J. SPENCER OVERHOLSER, Primary Examiner

M. O. SUTTON, Assistant Examiner

U.S. Cl. X.R.

425—327